US007477988B2

(12) United States Patent
Dorum

(10) Patent No.: US 7,477,988 B2
(45) Date of Patent: Jan. 13, 2009

(54) DUAL ROAD GEOMETRY REPRESENTATION FOR POSITION AND CURVATURE-HEADING

(75) Inventor: Ole Henry Dorum, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 2 days.

(21) Appl. No.: 11/434,993

(22) Filed: May 16, 2006

(65) Prior Publication Data

US 2007/0288158 A1 Dec. 13, 2007

(51) Int. Cl.
*G01C 21/30* (2006.01)
(52) U.S. Cl. .................................. 701/208; 701/200
(58) Field of Classification Search .............. 345/56; 701/200, 208
See application file for complete search history.

(56) References Cited

U.S. PATENT DOCUMENTS

| | | | | |
|---|---|---|---|---|
| 6,029,173 | A | 2/2000 | Meek et al. | 707/102 |
| 6,304,818 | B1* | 10/2001 | Kamiya | 701/200 |
| 6,366,851 | B1 | 4/2002 | Chojnacki et al. | 701/208 |
| 6,476,780 | B2* | 11/2002 | Matsunaga | 345/56 |
| 6,674,434 | B1* | 1/2004 | Chojnacki et al. | 345/428 |
| 6,675,090 | B2 | 1/2004 | Matsuura | 701/200 |
| 6,704,648 | B1 | 3/2004 | Naik et al. | 701/208 |
| 6,732,046 | B1* | 5/2004 | Joshi | 701/208 |
| 6,751,547 | B2* | 6/2004 | Khosla | 701/200 |
| 6,862,523 | B2* | 3/2005 | Joshi | 701/208 |
| 6,977,630 | B1* | 12/2005 | Donath et al. | 345/7 |
| 7,002,578 | B1* | 2/2006 | Ritter | 345/427 |
| 7,072,764 | B2* | 7/2006 | Donath et al. | 701/200 |
| 7,084,882 | B1* | 8/2006 | Dorum et al. | 345/589 |
| 7,152,022 | B1* | 12/2006 | Joshi | 703/2 |
| 7,181,344 | B2* | 2/2007 | Lehmann et al. | 701/208 |
| 2005/0004753 | A1 | 1/2005 | Weiland et al. | 701/208 |
| 2005/0209781 | A1* | 9/2005 | Anderson | 702/5 |
| 2005/0246091 | A1 | 11/2005 | Kuroda et al. | 701/200 |
| 2007/0008090 | A1* | 1/2007 | Gertsch et al. | 340/435 |
| 2007/0182751 | A1* | 8/2007 | Rasmussen et al. | 345/562 |

\* cited by examiner

*Primary Examiner*—Mark Hellner
(74) *Attorney, Agent, or Firm*—Lisa M. Schoedel; Frank J. Kozak; Jon D. Shutter

(57) ABSTRACT

A way to represent roads as data is disclosed. Vehicle systems that provide driver assistance features relating to road curvature, such as curve warning systems or lane departure systems, use data that indicates road shape and data that indicate road position. To support these vehicle systems, a dual data representation of road geometry is provided. One road geometry data representation indicates the road position, e.g., road centerline or lane centerline, and the other road geometry data representation indicates the road shape, e.g., curvature and/or heading. Several different dual shape representations may be provided and can co-exist with existing and future database representations.

32 Claims, 11 Drawing Sheets

(DIVIDED HIGHWAY)

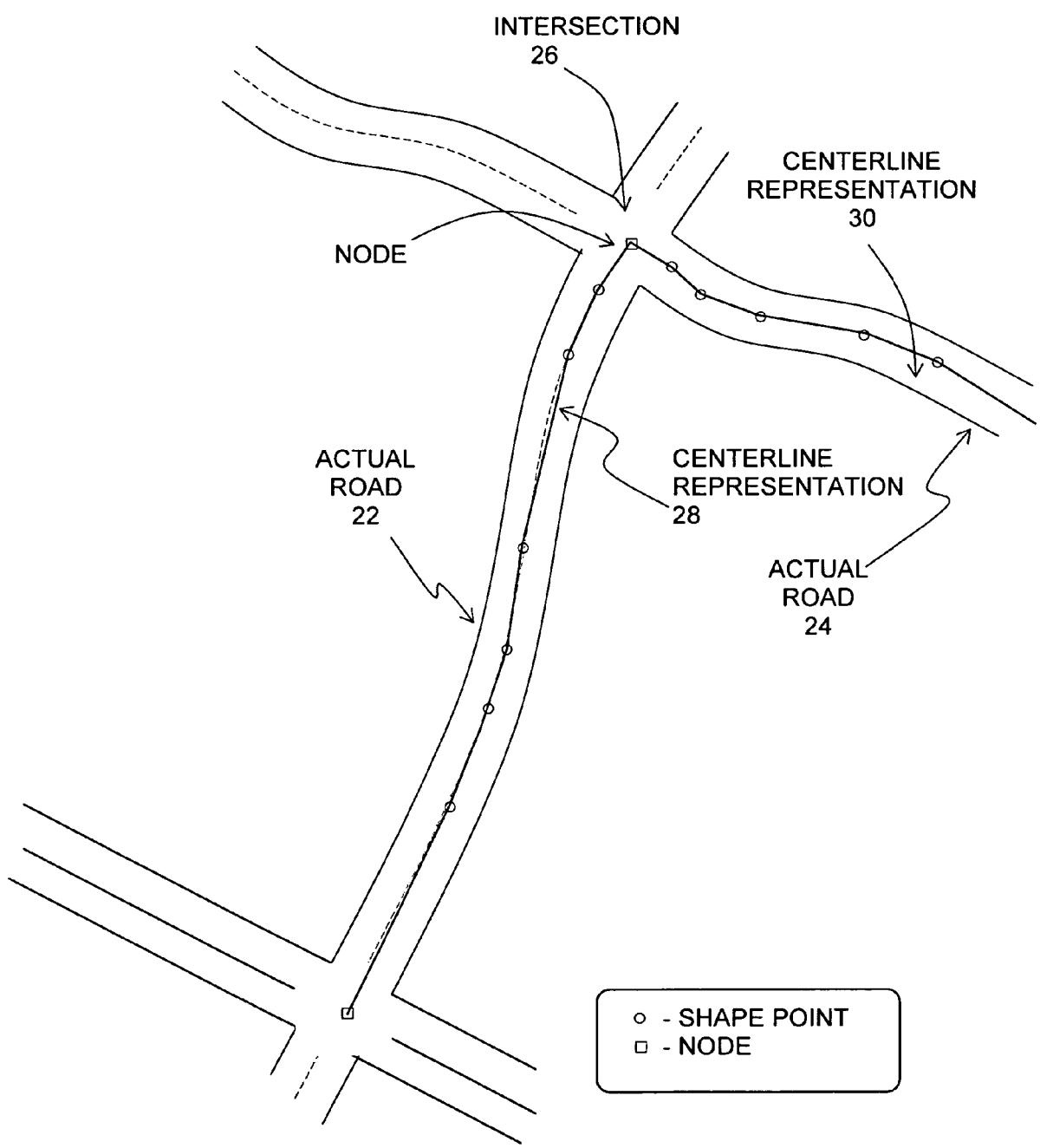

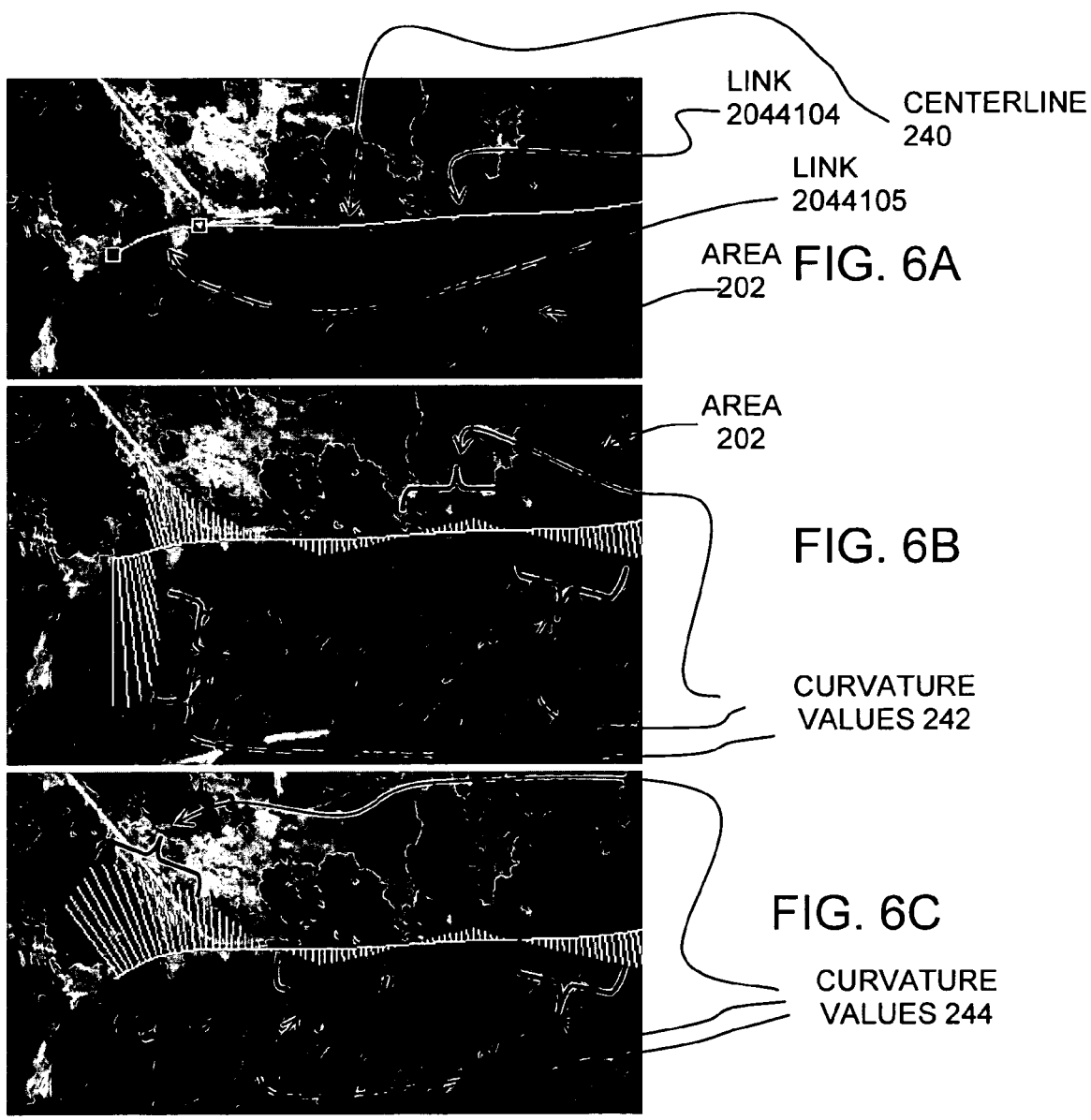

DUAL ROAD GEOMETRY REPRESENTATION FOR POSITION AND CURVATURE-HEADING

BACKGROUND OF THE INVENTION

The present invention relates to map data for on-road vehicles, such as automobiles, trucks, and buses, and in particular to map data that supports advanced driver assistance systems for such on-road vehicles.

Advanced driver assistance systems ("ADAS systems") have been developed to improve the comfort, convenience, efficiency, and overall satisfaction of driving. Examples of advanced driver assistance systems include adaptive headlight aiming, curve warning, adaptive cruise control, and adaptive shift control, as well as others. Some of these advanced driver assistance systems use sensor mechanisms in the vehicle, such as radar and vision-oriented sensors (e.g., cameras), to determine the current state of the vehicle and the roadway around the vehicle.

Some advanced driver assistance systems use digital map data to provide information about the road network, road geometry, road conditions and other features associated with the road network around the vehicle. Digital map data is not affected by environmental conditions, such as fog, rain or snow. In addition, digital map data can provide useful information, such as speed limits, traffic and lane restrictions, etc., that cannot reliably be obtained by cameras or radar. Further, digital map data can be used to determine the road ahead of the vehicle even around corners or beyond obstructions. Accordingly, digital map data can be a useful addition for some advanced driver assistance systems.

For some advanced driver assistance system applications, it is useful to have a relatively accurate representation of road shape properties, such as curvature and heading. Prior map database representations of roads include data that indicates the positions of the roads from which curvature and heading can be derived. However, using prior map database representations of roads to obtain curvature or heading data can produce irregularities under certain circumstances.

Accordingly, there exists a need for a way to reliably and accurately represent the curvature or heading of roads in a map database.

BRIEF DESCRIPTION OF THE DRAWINGS

FIG. 1B illustrates how a non-divided road segment is represented in a prior map database.

FIG. 5A shows an aerial image of still another portion of a road network with overlays illustrating how the road segments are represented in a prior map database.

FIG. 5B shows the same aerial image in FIG. 5A with overlays illustrating actual vehicle paths of travel along the roads.

FIG. 5C shows the same aerial image in FIG. 5B with overlays illustrating the resulting curvature calculated along the actual vehicle paths of travel.

FIG. 6A shows the same aerial image in FIGS. 5A-5C with an overlay illustrating the positional part of a dual representation of the road geometry for one of the depicted roads.

FIG. 6B shows the same aerial image in FIG. 6A with an overlay illustrating a first curvature part of the dual representation of the road geometry for the depicted road.

FIG. 6C shows the same aerial image in FIGS. 6A and 6B with an overlay illustrating a second curvature part of the dual representation of the road geometry for the depicted road.

DETAILED DESCRIPTION OF THE PRESENTLY PREFERRED EMBODIMENTS

Prior map databases, in particular map databases used for navigation, include information about the physical locations of represented road segments. Information about the physical locations of road segments is used by navigation systems to help determine where a user is located, whether a vehicle has deviated from a calculated route, how close a user is to a desired destination, and various other purposes.

Figure 1A:
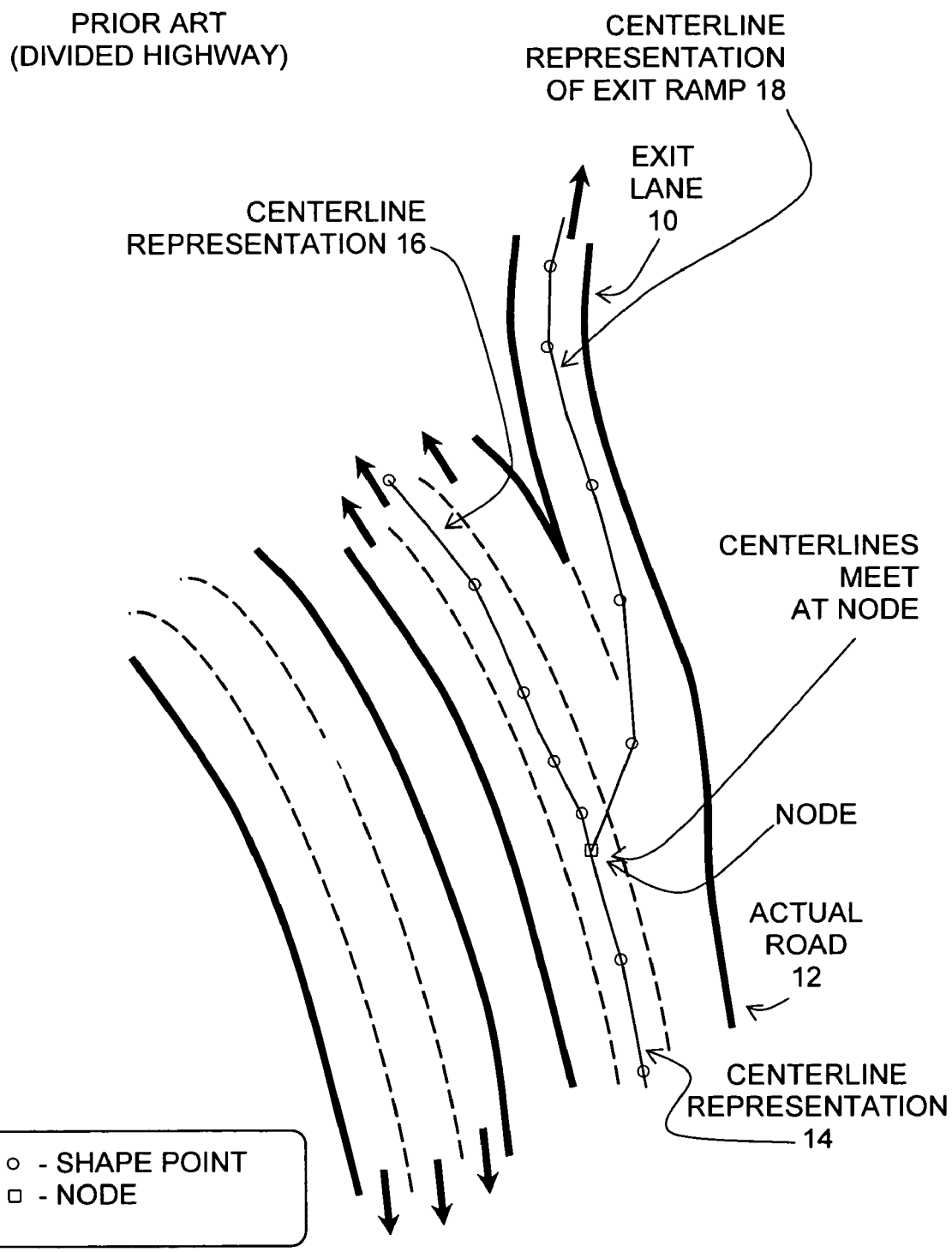
FIG. 1A illustrates how a divided road segment is represented in a prior map database.

In some prior map databases, the physical location of a represented road segment is indicated by its centerline, or in the case of a divided highway, by the centerlines of the groups of lanes heading in each direction. FIG. 1A illustrates how a divided road segment is represented by its centerline in a prior map database. In FIG. 1A, an exit ramp 10 connects to a divided highway 12. In the map data that represents these road segments, the location where the exit ramp 10 and the divided highway 12 meet is determined and represented by a node data entity, which is associated with data that indicates the geographic coordinates of the node. In the map database that represents these road segments, the exit ramp 10 and the divided highway 12 are represented by road segment data entities. The locations of the road segments are represented by their centerlines 14, 16, 18. Data that defines these centerlines is stored with the road segment data entities that represent these road segments.

FIG. 1B illustrates how a non-divided road segment is represented by a map database. In FIG. 1B, roads 22 and 24 meet at an intersection 26. In the map database that represents these road segments, the location where the roads meet is determined and represented by a node data entity, which is associated with data that indicates the geographic coordinates of the node. In the map database, the road segments are represented by road segment data entities. The locations of these road segments are indicated by their centerlines 28 and

30. Data that defines the centerlines 28 and 30 is stored with the respective road segment data entities that represent these road segments.

For straight road segments, the centerline can be accurately defined by data indicating the coordinates of the nodes at the end points of the road segment. For curved road segments, like those shown in FIGS. 1A and 1B, centerlines may be defined by one or more shape points located between the nodes at the end points of the road segments. In FIGS. 1A and 1B, straight lines are shown connecting the shape points so that the centerline is approximated by a piecewise linear series of short straight lines.

Instead of representing the centerline as a series of short straight lines, the centerline can be represented as a curve. There are various different ways that such a centerline curve can be determined and defined. For example, a curve can be fitted through the shape points using known curve-fitting techniques.

As stated above, it would be useful for some advanced driver assistance systems to have data that indicates the curvature along road segments. One approach to obtaining data that indicates the curvature of a road segment is to derive the curvature of the centerline used to represent the location of the road segment in a map database. However, using the curvature of the centerline of a road as the curvature of the actual road segment can lead to occasional irregularities.

It has been determined that for road-level geometry, as well as lane-level geometry, position constraints and curvature constraints cannot both be satisfied with a single curve. For road-level geometry, this results from connectivity restrictions (i.e., node placement) in the database schema, and for lane-level geometry, this limitation results from different requirements in modeling resolution because the road center shape varies more rapidly than the road curvature.

If a single geometric curve entity were used for both geometry position and curvature, road curvature would be directly linked to the local road/lane curve shape and vice versa. Due to the sensitivity of curvature with respect to perturbation in local curve shape, any small variations in local curve shape would have relatively large undesirable effects on the resulting curvature while potentially still complying with the positional accuracy requirements. This means that positional and curvature requirements cannot both be met by a single curve entity.

Present disclosed embodiments overcome these limitations by providing a dual representation for the road geometry to provide improved road curvature (and heading). According to these embodiments, there is one road geometry representation for the positional road map data (e.g., road center or lane center), and another road geometry representation for the road shape (i.e., curvature and/or heading). Several different dual shape representations may be provided and can co-exist with existing and future database representations. Some of these dual shape representations include: road center curve, lane center curve, vehicle path, analytical curvature function, etc. Possible implementations include splines, clothoids, analytical curvature functions, series approximations, discrete mapped values, etc.

EXAMPLES

Problems using a single curve representation for both position (i.e., road or lane center) and shape (i.e., curvature/heading) are illustrated in the following examples.

Example 1

Figure 2:
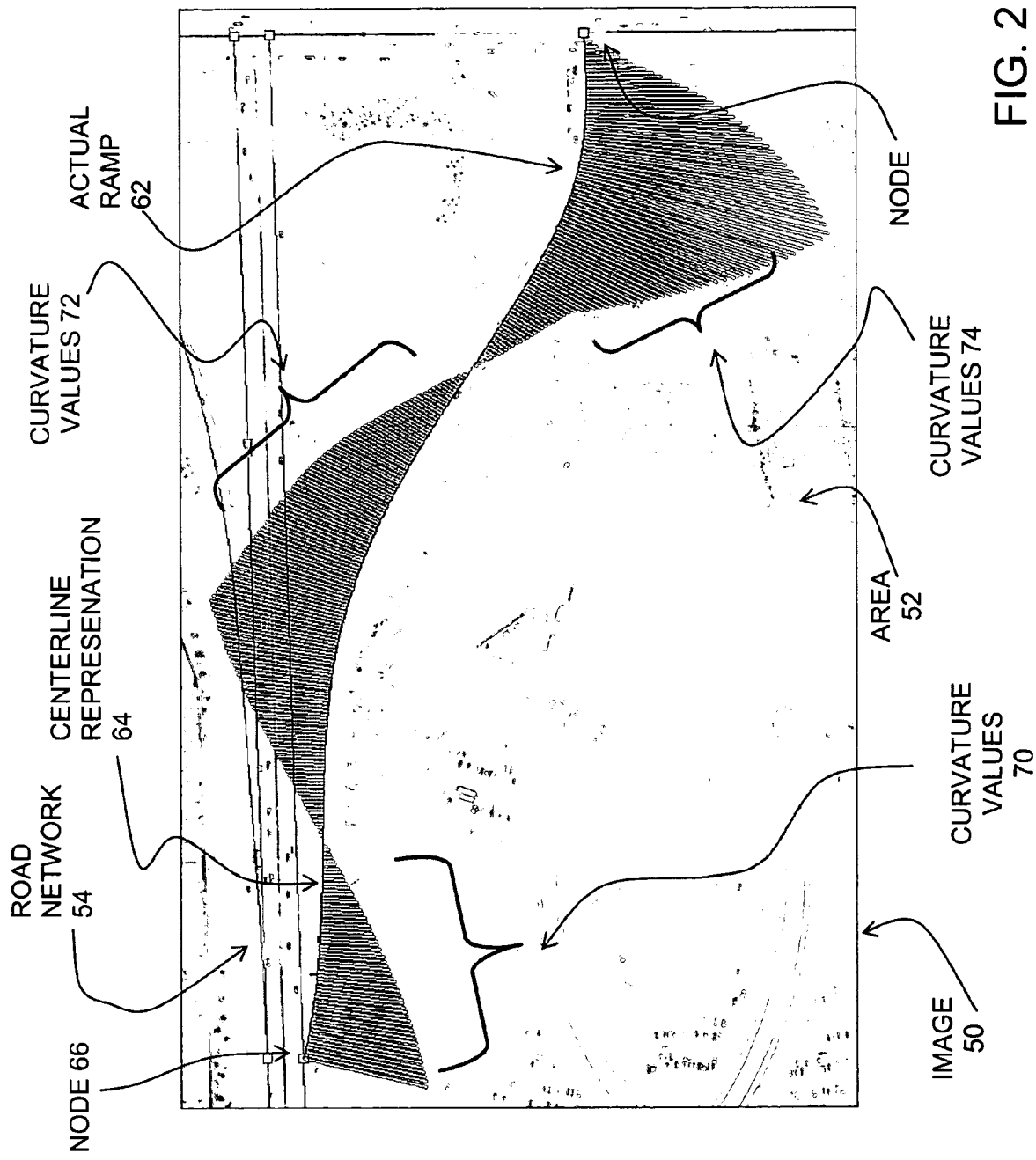
FIG. 2 is an aerial image of a portion of a road network with overlays illustrating how the road segments are represented in a prior map database and the resulting curvature calculated using the prior representation.

FIG. 2 shows an aerial image 50 of an area 52 that includes a portion of a road network 54. The aerial image 50 shows an actual ramp 62. Overlaid on the aerial image 50 is a line 64. The line 64 is generated from data in a map database used to represent the actual ramp 62. More specifically, the line 64 is generated from data used to represent the physical location of the actual ramp 62 in a map database. According to the specification used to develop the map database, the line 64 used to represent the ramp should align generally with the physical centerline of the actual ramp 62. However, the specification used to develop the map database provides for certain exceptions when representing the location of a road segment by the location of its centerline. One exception is that the positions of the endpoints of a line generated from the data used to represent a road segment are constrained to connect to the existing nodes (i.e., the endpoints where one road segment meets another road segment). The example in FIG. 2 illustrates how a ramp road curve diverges from the positional road center requirement in order to comply with the requirement to connect to the ramp node 66.

If the centerline data were used to determine the curvature along the exit ramp road segment, irregularities would be encountered. The type of irregularity is illustrated in the example of the exit ramp in FIG. 2. The values of the curvature along the line 64 are illustrated by the lengths of the straight lines 70, 72, and 74, extending normally from the centerline 64. The ramp centerline curve 64 bends at the beginning of the ramp (as indicated by the curvature values 70) to connect to the node 66 while still maintaining closeness to the road center.

Due to the sensitivity of curvature with respect to perturbation in local curve shape, even the slight bend in the centerline curve 64 causes a significant curvature spike at the beginning of the ramp, as indicated by the curvature values 70. Such false curvature spikes may cause difficulties for some advanced driver assistance applications, such as curve speed warning applications.

As illustrated in this example, using road segment centerline data to determine the curvature of a road can lead to inaccurate results, especially where road segments connect abruptly (i.e., over a relatively short or no distance). Exit ramps are examples where road segments connect abruptly.

Figure 3:
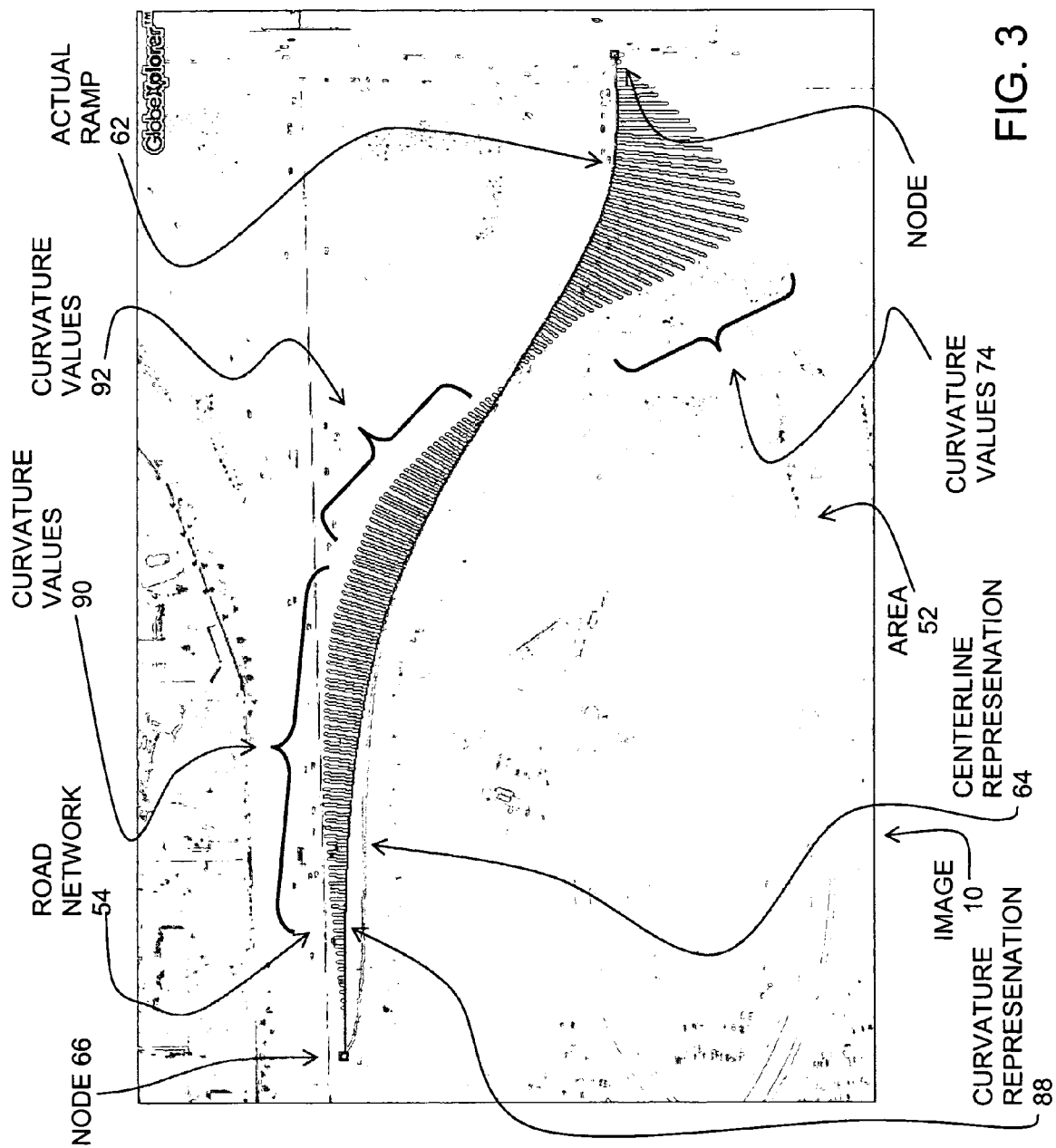
FIG. 3 is an aerial image of the same portion of a road network shown in FIG. 2 with overlays illustrating how the road segments are represented according to a disclosed embodiment and the resulting curvature calculated using the disclosed embodiment.

FIG. 3 shows how a dual (i.e., two-curve) road geometry representation can be used to describe the positional road geometry and road curvature. In FIG. 3, a new road curve 88 has been adjusted so that its shape represents the curvature of the actual ramp road center. The ramp curvature, indicated by curvature values 90, 92 and 74, is now correctly represented without any false curvature spikes.

(Note that the curve used for the curvature/shape representation is not constrained to connect to the nodes. Further note that curve representations may overlap each other.)

Example 2

Another example of introduced false curvature that results from using the position of the road centerline occurs when the number of lanes changes. A change in the number of lanes influences the road centerline position, as illustrated in FIG. 4.

Figure 4:
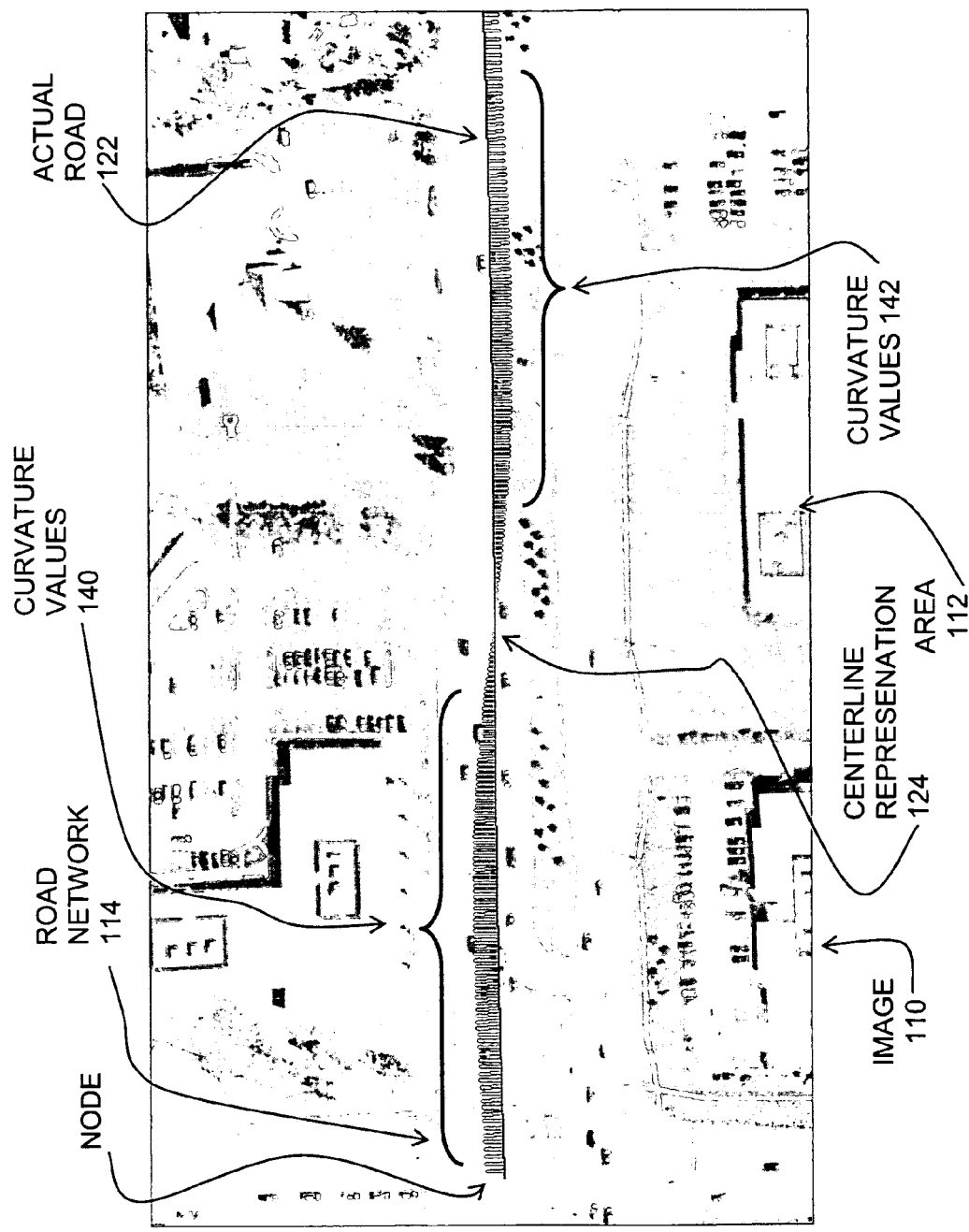
FIG. 4 is an aerial image of another portion of a road network with overlays illustrating how the road segments are represented in a prior map database and the resulting curvature calculated using the prior representation.

FIG. 4 shows an aerial image 110 of an area 112 that includes a portion of a road network 114. The aerial image 110 shows an actual road 122. Overlaid on the aerial image 110 is a line 124. The line 124 is generated from data used to represent the actual road 122 in a map database and represents the physical location of the centerline of the road 122. According to the specification used to develop the map database, the line 124 used to represent the road aligns generally with the physical centerline of all the lanes (in one direction)

of which the road is comprised. However, where the number of lanes changes, a corresponding lateral shift in the centerline occurs, even though the lanes themselves are straight.

The lateral shifting of the road centerline causes an unwanted curvature (indicated by the lines 140 and 142) to be introduced in the area around the locations where the number of lanes changes. In a dual representation of this road segment, a separate straight line (indicating zero curvature) would be included for the entire segment.

Example 3

The next example in FIGS. 5A, 5B and 5C illustrates how road curvature is dependent on a vehicle path or maneuver. FIGS. 5A, 5B and 5C are aerial images 200 of an area 202 in which roads meet at an intersection.

Overlaid on FIG. 5A is the positional road geometry (i.e., the centerline representations 210) of the three road segments meeting at an intersection node. Overlaid on the image in FIG. 5B are the possible vehicle paths (indicated by the lines 222) through the intersection. The path that a vehicle takes through the intersection depends on the desired maneuver or chosen route. FIG. 5C shows the curvature profile (i.e., curvature values 232, 234 and 236) for each of the possible vehicle paths 222 through the intersection. The curvature profiles 232 show the curvature for the south-east vehicle path. The curvature profiles 234 show the curvature for the east-west vehicle path. The curvature profiles 236 show the curvature for the south-west vehicle path. As shown by FIG. 5C, the curvature for approaching, entering and exiting the intersection can be quite distinct depending on the desired maneuver at the intersection.

A dual representation that addresses this situation would be extended to reflect multiple curvature functions for each road segment.

FIGS. 6A, 6B and 6C show one possible dual road geometry representation that uses two or more B-splines to represent positional road geometry and its curvature/heading. FIGS. 6A, 6B and 6C show an example for link 2044105 where the road representation consists of three curves; one for the road center geometry curve (line 240 in FIG. 6A), and two curves for the maneuver-dependent road curvature/heading: The curvature values for the eastbound maneuver path are indicated by the lines 242 in FIG. 6B and the curvature values for the southbound maneuver path are indicated by the lines 244 in FIG. 6C.

Road Link Geometry B-Spline Road Center Curve for Link 2044105:
  Control Points:
    37.3764769807727, −122.1663128109364
    37.3765279984324, −122.1662260923172
    37.3765431966615, −122.1661169944101
    37.3765438324253, −122.1659513615504
  Knot Vector:
    (0, 0, 0, 0, 1, 1, 1, 1)
  Curve Length: 24.79 meters
South-East Maneuver B-Spline Shape Curve for Link 2044105:
  Control Points:
    37.3765479761620, −122.1659552179730
    37.3765501148576, −122.1660327364868
    37.3765428766386, −122.1661475865591
    37.3764924890996, −122.1662486680855
    37.3764721372598, −122.1662806510816
  Knot Vector:
    (0, 0, 0, 0, 1.31713557, 2, 2, 2, 2)

East-West Maneuver B-Spline Shape Curve for Link 2044105:
  Control Points:
    37.3765576628816, −122.1659612018338
    37.3765556972230, −122.1660272433453
    37.3765463036549, −122.1661528616981
    37.3765138765444, −122.1662432198899
    37.3765111328391, −122.1663038934853
  Knot Vector:
    (0, 0, 0, 0, 0.98779066, 2, 2, 2, 2)

This representation allows computation of the road geometry at any point since it is a smooth continuous curve. Since the road geometry is an analytical curve, the shape properties can be computed for the curve as well and may be used for computing vehicle heading. The two shape representations allow curvature or heading to be computed for any point along the road segment as well and will depend on the desired maneuver/mapped route.

Example 4

Figure 7:
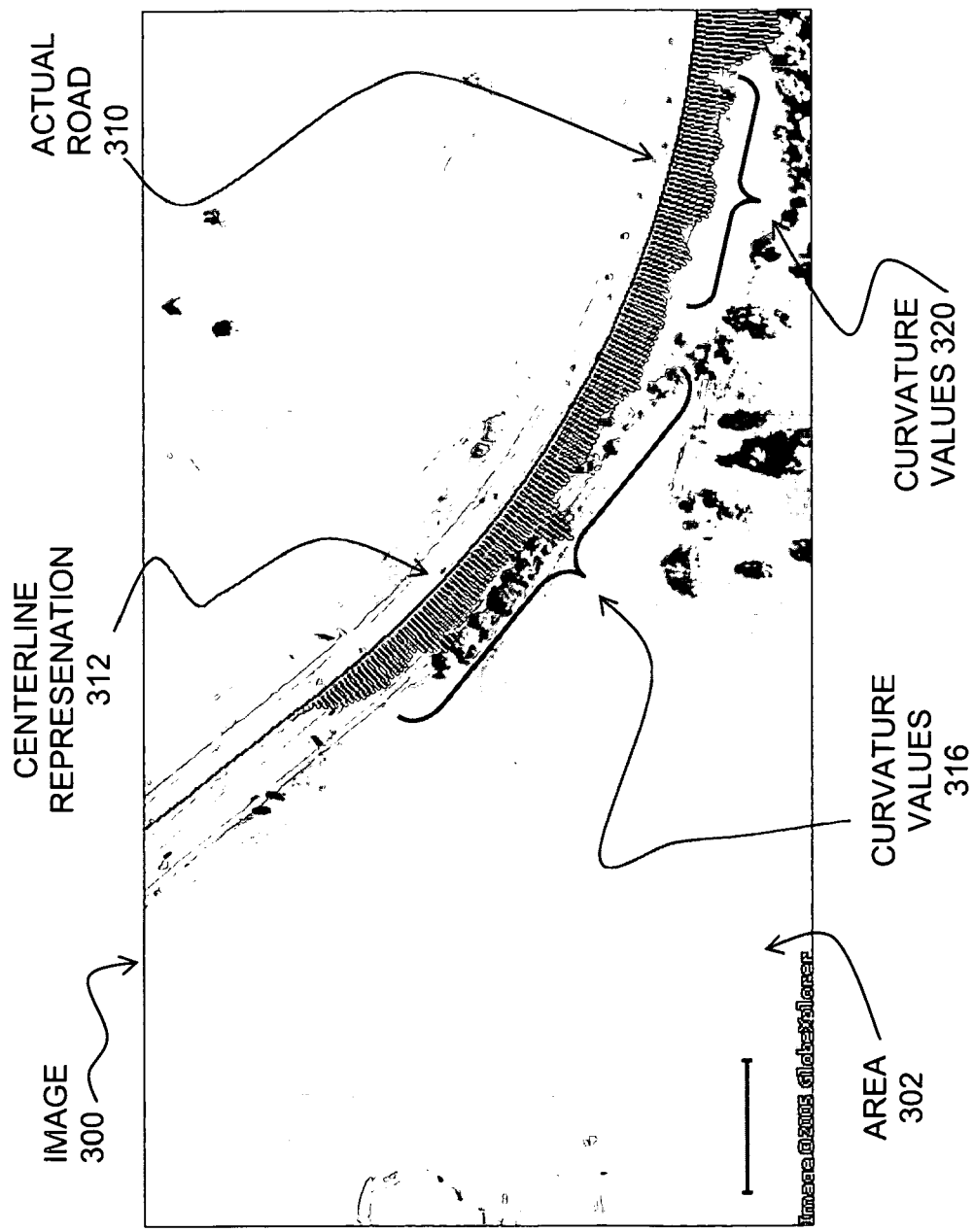
FIG. 7 is an aerial image of yet still another portion of the road network with overlays illustrating the curvature calculated from the centerline curve.

The next example illustrates advantages of using a dual representation for lane level geometry. For lane level geometry, it is difficult to represent lane shape (i.e., curvature) and lane position with a single curve representation and simultaneously comply with low frequency advanced driver assistance system requirements (e.g., for a curve speed warning application) and high frequency center position requirements (e.g., for a lane departure application). This is because the lane center shape varies more rapidly than the road curvature. Applications for lane departure warnings use accurate lane center geometry. The lane center is defined by the lane marking paint stripes and typically should be represented with an accuracy of 10-30 cm. However, when representing the lane center with this level of accuracy, the lane curve may exhibit too much variation to yield smooth reliable curvature. FIG. 7 shows how curvature computed from a lane center curve results in a noisy, unreliable curvature. FIG. 7 is an aerial image 300 of an area 302 that shows an actual road 310. A line 312 is determined that defines the centerline. Curvature values 316 are derived from the centerline. Some of these curvature values exhibit a false variation as indicated at 320.

Lane center position uses higher resolution and variation frequency than the corresponding road or lane shape/curvature. The lane center geometry curve may be defined as a flexible high accuracy curve capable of capturing high frequency lane center variations (see FIG. 9A). For road lane geometry, it may not be desirable to represent road curvature (which varies slowly) with the same curve as the road lane center, which captures high frequency local variations for lane departure applications.

Figure 8:
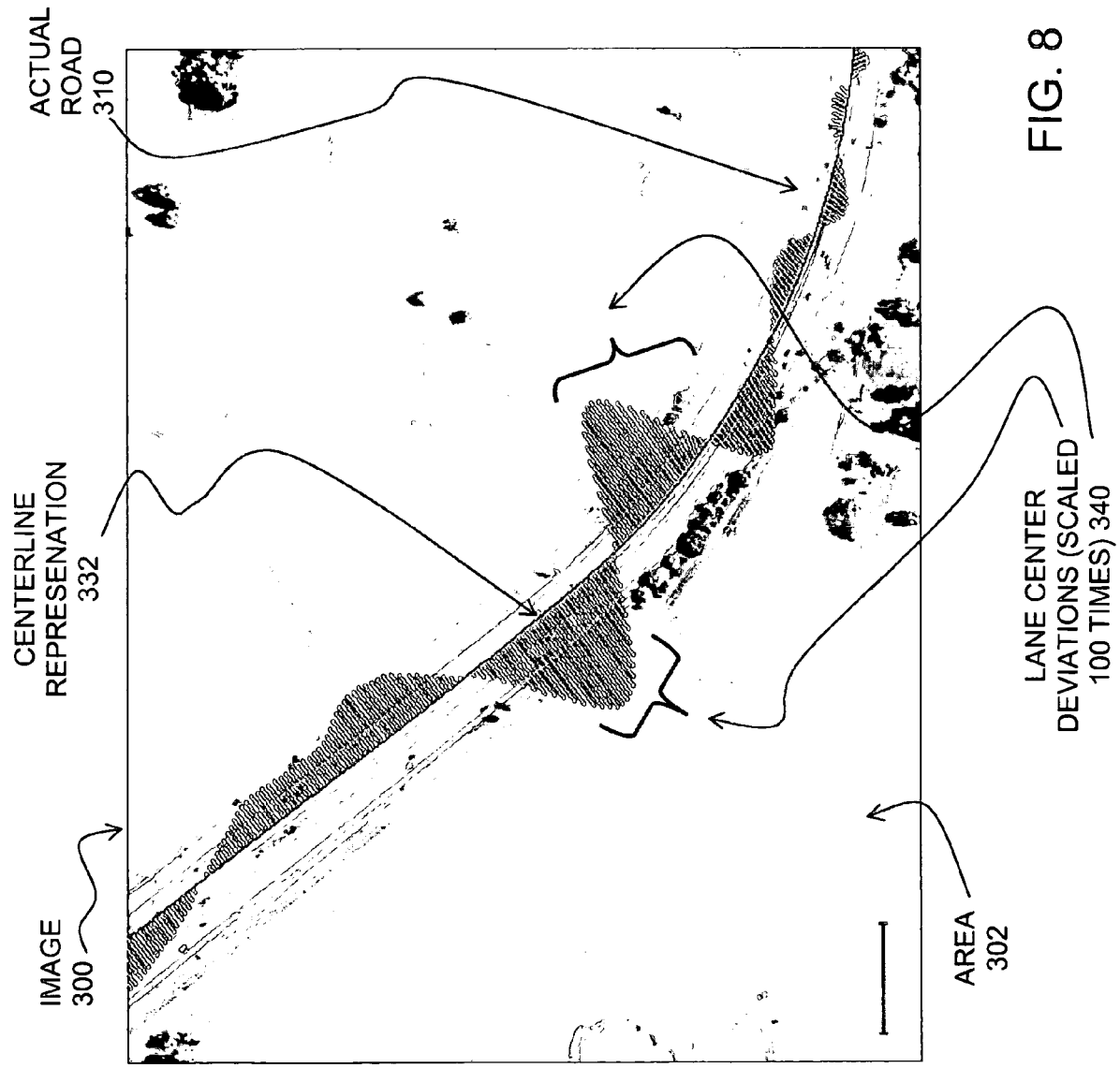
FIG. 8 shows the same aerial image in FIG. 7 with overlays illustrating the scaled deviation of centerline data when derived from curvature data.

Conversely, if geometry suitable for representing road/lane curvature were used to also represent the lane center, the geometry could be too smooth to be useful for lane departure applications. FIG. 8 shows an example of a lane shape curvature curve 332 being used to represent the lane center. FIG. 8 shows the same portion of road 310 shown in FIG. 7. FIG. 8 shows that although the smooth nature of the curvature spline curve is well suited for representing lane curvature and the overall-shape of the road, it is not well suited to capture rapid variations in lane center positions, as indicated by the lane center deviations (scaled 100 times) 340. The vectors 340 (scaled 100 times for visibility) show how the lane center (computed from lane paint stripe markings) deviates from the lane curvature spline curve. Lane markings typically vary in a sine wave-like pattern with deviation in the order of +/−0.3-0.5 m per 300 m wavelength.

Figure 9A:
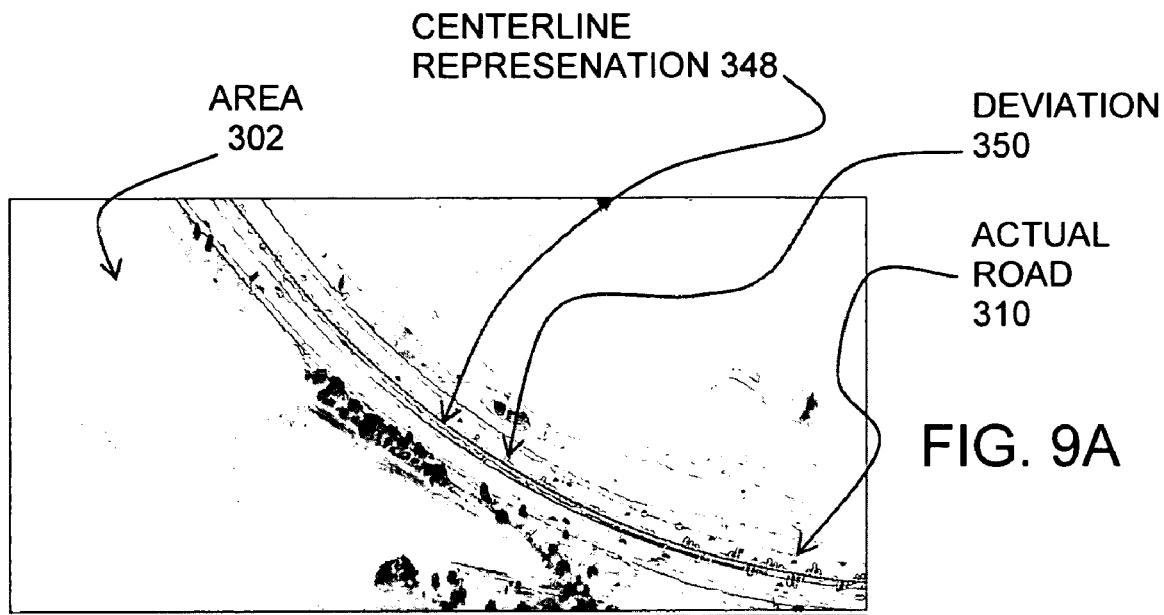
FIG. 9A shows the same aerial image in FIGS. 7 and 8 with overlays illustrating the scaled deviation of centerline data from the true lane center.
Figure 9B:
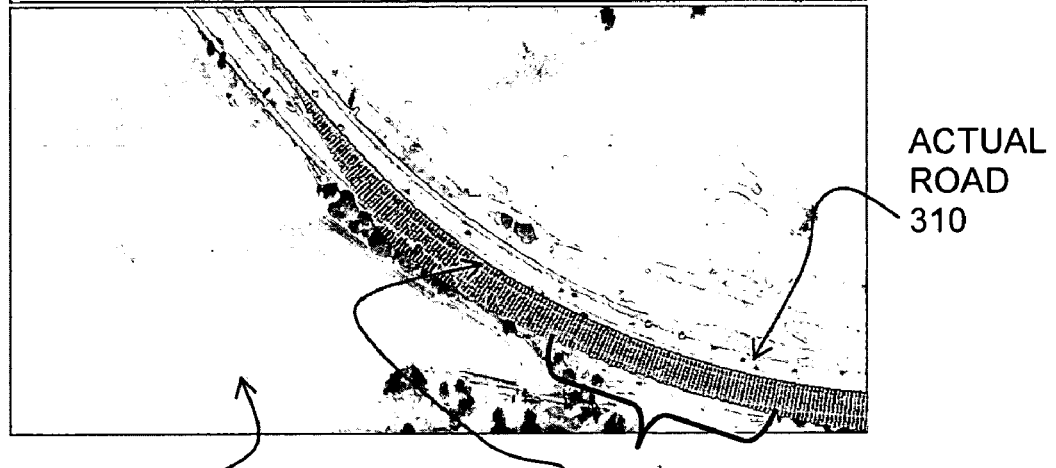
FIG. 9B shows the same aerial image in FIG. 9A with overlays illustrating the curvature.

As shown in FIGS. 9A and 9B, a dual geometry representation for lane geometry may be used to address these considerations. Using a dual geometry representation, a high resolution (rapidly varying), high precision lane center curve 348, as shown in FIG. 9A, would be used for lane departure applications and a separate high accuracy but low resolution (slow varying) curve 354, as shown in FIG. 9B, would be used to represent the smooth, slow-varying lane curvature. FIG. 9A shows values 350 indicating the deviation of the high resolution, high precision lane center curve 348 from the true lane center (i.e., the deviation values are scaled by 1000). The deviation is less than 1.5 cm. FIG. 9B shows the smooth curvature values 358 for the low resolution, slow varying curve 354.

Dual Representation Embodiments

The disclosed embodiments include a dual geometry representation for road segments. In a dual geometry representation, one geometric entity (e.g., record, attribute, field) is used for the road/lane position p=(s) (e.g., latitude, longitude or x, y of the road/lane center), and another entity is used to represent road shape, such as curvature κ(s) or heading t=t(s).

For purposes of the road geometry position entity, a shape point based representation or a spline based representation, such as a B-spline, may be used.

For purposes of the road geometry shape entity, any continuous curve representation such as a spline, clothoid, analytical curvature function, or series approximation may be used. Discrete mapped values that do not provide continuous smooth curvature are not preferred for representing the road geometry shape; however discrete mapped values may be associated as attributes with a curve. The purpose of this representation is to be able to compute curvature k (and/or heading t) at any point along the road or lane.

The examples described above use spline curves for both the shape based representation as well as the positional road geometry. Splines are well suited to represent road position since they are translational and rotational invariant. For the same reasons, spline curves are suitable for representing curvature and heading since any point on a spline curve has both heading (i.e., tangent) and signed curvature.

Possible Alternative Ways for Representing Road/Lane Center Geometry:
list of (latitude, longitude) shape points
parametric spline B(s): [x(s)=$B_x(s)$, y(s)=$B_y(s)$], where the B(s) is a parameterized spline curve with parameters s along the curve.
clothoids.

Possible Alternative Ways for Representing Road/Lane Shape:
parametric spline curve B(s): [x(s)=$B_x(s)$, y(s)=$B_y(s)$] (approximating the road/lane center or vehicle path), where B(s) is a parameterized spline curve with parameters s along the curve. Curvature can then be computed as:

$$\kappa(s) = \frac{x^s(s)y^{ss}(s) - y^s(s)x^{ss}(s)}{((x^s(s))^2 + (y^s(s))^2)^{3/2}}.$$

and heading can be computed as:

$$t(s)=[x^s(s), y^s(s)]$$

polynomial function κ=κ(s) where s is some parameter along the road segment and κ(s) is the signed curvature at that location:

$\kappa(s)=as^N+bs^{N-1}+\ldots+c$ and for heading $t(s)=[t_x(s), t_y(s)]$ any other analytical curvature function κ=κ(s) (including splines) where s is some parameter along the road segment and κ(s) is the signed curvature at that location along the road. Similarly for heading (tangent) t=t(s).
clothoids
series approximations In the case of parametric splines, it is also possible to introduce multiple dimensions, so that both (x, y) or (lat, long) position and curvature are controlled by a single multi-dimensional spline curve:

$$B(s): [x(s)=B_x(s), y(s)=B_y(s), \kappa(s)=B_\kappa(s)]$$

and even elevation:

$$[x(s)=B_x(s), y(s)=B_y(s), z(s)=B_z(s), \kappa(s)=B_\kappa(s)]$$

It may be preferable to use a separate curve to represent shape (curvature/heading) since it is visually easy to manipulate and control.

Use of Dual Representation Road Geometry

Figure 10:
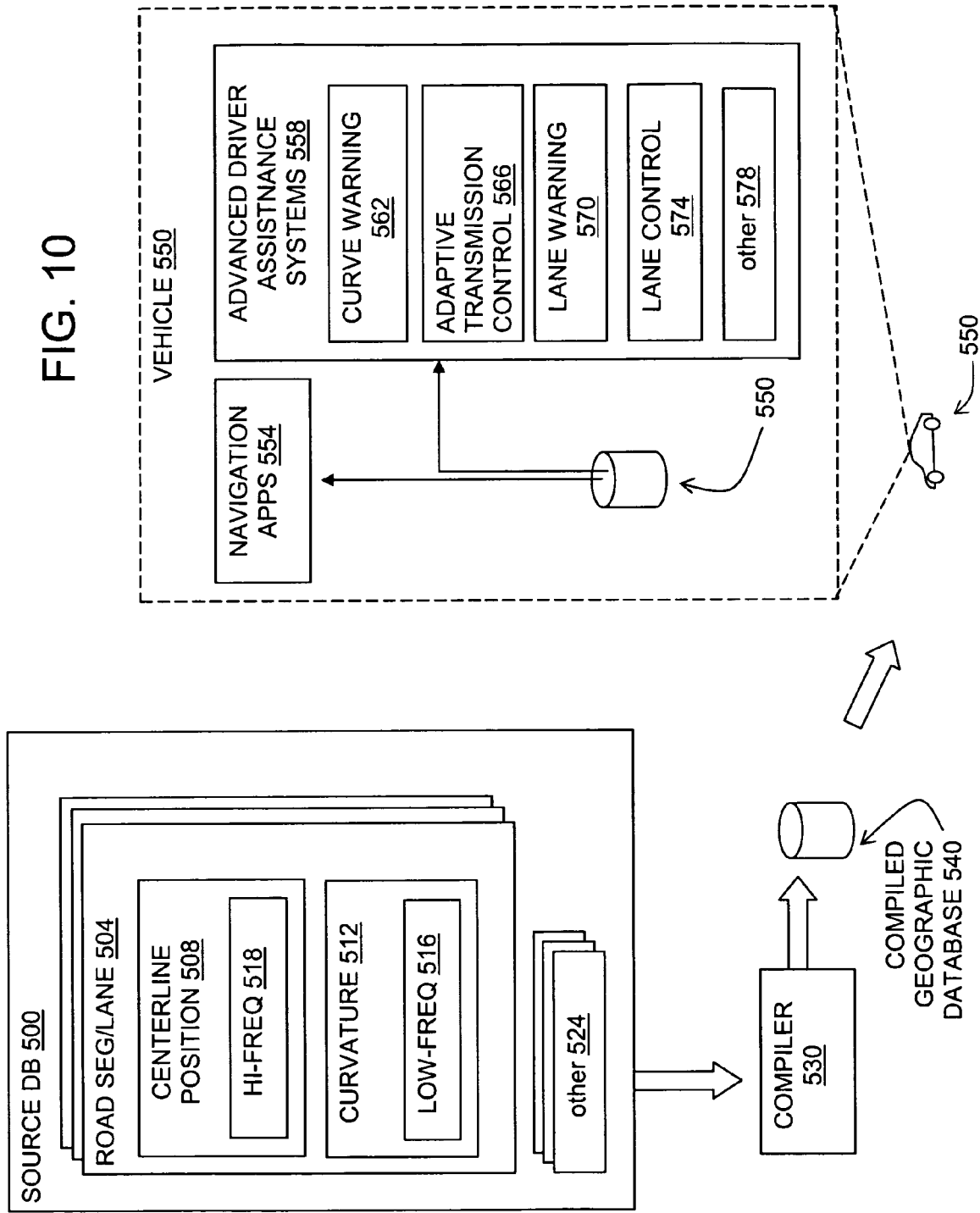
FIG. 10 is a block diagram of a system in a vehicle that uses map data that includes a dual representation of road geometry.

FIG. 10 is a block diagram of a system for using map data that includes a dual representation of road geometry. In FIG. 10, a source database 500 contains data that represents geographic features in a coverage area. The coverage area may correspond to an entire country, several countries, or one or more regions within a country.

The data about the geographic features in the coverage area is collected by a geographic database developer. There are different ways that the geographic database developer can use to collect data, including digitizing aerial photographs, obtaining data from other sources, having field personnel travel by vehicle along roads throughout the geographic region to observe features and record information about them, and using probe vehicles, as well as other methods.

The source database 500 includes data 504 about the roads located in the coverage area. The data 504 about the roads includes various kinds of information, such as the geographic positions of the roads, street names of the roads, addresses ranges along the roads, turn restrictions at intersections of roads, and so on. In the embodiment shown in FIG. 10, the source database 500 includes a dual representation of the road geometry for at least some of the represented roads. As described in more detail above, the data that represents roads 504 includes centerline position data 508 and curvature (and/or heading) data 512. In one embodiment, the centerline position data 508 may include high frequency road/lane center data 518 (i.e., useful for positioning, and lane departure warning systems). The curvature data 512 may include low frequency curvature data 516 (i.e., useful for curve warning systems).

The source database 500 may include other kinds of data 524, such as data about points of interest, places (such as cities, towns, or other communities), and so on.

The source database 500 is updated, expanded, and/or otherwise modified by the geographic database developer on a regular and continuing basis. To facilitate these operations, the source database 500 may be stored in a format that facilitates updating, maintenance, and development.

The source database 500 is used to make compiled databases 540. The compiled databases 540 are made using a compiler 530. The compiler 530 is a software program run on an appropriate computer platform. The compiled databases 540 may include only a portion of all the data in the source database 500. The compiled databases 540 are in a format suitable for use by applications and systems that provide navigation and/or advanced driver assistance features. For example, the compiled geographic databases 540 may include appropriate indexing, layering, parcelization, compression, and other types of organization or arrangements that facilitate use of the data for providing navigation and/or advanced driver assistance applications.

The compiled databases 540 are installed and used in vehicles 550. In a vehicle 550, the compiled database 540 may be used by various vehicle applications or systems, including advanced driver assistance systems 558, such as a curve warning system 562, an adaptive transmission control system 566, a lane departure warning system 570, a lane departure control system 574, and possibly other systems 578. The compiled database 540 may also be used by an in-vehicle system 554 that provides navigation-related features, such as route calculation, route guidance, vehicle positioning, and map display.

CONCLUSION

A dual road geometry representation offers significant advantages over prior methods and techniques for representing both positional road geometry as well as road geometry shape properties such as curvature and heading. The dual representation is flexible, since different mathematical representations may be used, and it can co-exist with existing database representations as well as future database representations. Since the dual shape representation is decoupled from the road position representation, it can evolve without affecting the existing road representation and can be maintained and migrated without need for change as a road based representation evolves over time.

This representation offers a significant advantage since it allows introduction of continuous smooth curvature and heading into an existing database model without affecting existing shape point-based representation, thus making advanced driver assistance application functionality available.

It is intended that the foregoing detailed description be regarded as illustrative rather than limiting and that it is understood that the following claims including all equivalents are intended to define the scope of the invention.

I claim:

1. A computer-readable medium comprising a map database, the map database comprising:
   representations of road segments, wherein at least some of the road segments are represented by two separate types of data, wherein the two separate types of data include
   a first type of data that indicates a location of a line that coincides generally with a physical centerline of the represented road segment, wherein the data that indicates the location of the line includes a location of at least two nodes, and
   a second type of data that indicates a shape of the represented road segment, wherein the data that indicates the shape represents a substantially continuous curve that is independent of node location.

2. The computer-readable medium of claim 1 wherein the line that coincides generally with the physical centerline of the road segment represented by the first type of data extends to the physical positions associated with nodes that represent intersections where the road segment connects to adjacent road segments.

3. The computer-readable medium of claim 1 wherein the first type of data that indicates the location of a line that coincides generally with a physical centerline of the represented road segment comprises a list of shape points.

4. The computer-readable medium of claim 3 wherein each of the shape points indicates a latitude and longitude position.

5. The computer-readable medium of claim 1 wherein the first type of data that indicates the location of a line that coincides generally with a physical centerline of the represented road segment comprises a parametric spline.

6. The computer-readable medium of claim 1 wherein the first type of data that indicates the location of a line that coincides generally with a physical centerline of the represented road segment comprises a clothoid.

7. The computer-readable medium of claim 1 wherein the second type of data that indicates the shape of the represented road segment comprises a parametric spline curve.

8. The computer-readable medium of claim 1 wherein the second type of data that indicates the shape of the represented road segment comprises a polynomial function.

9. The computer-readable medium of claim 1 wherein the second type of data that indicates the shape of the represented road segment comprises any other analytical curvature function $\kappa=\kappa(s)$ where s is some parameter along the road segment and $\kappa(s)$ is a signed curvature at that location along the road segment.

10. The computer-readable medium of claim 1 wherein the second type of data that indicates the shape of the represented road segment comprises a clothoid.

11. The computer-readable medium of claim 1 wherein the second type of data that indicates the shape of the represented road segment comprises a series approximation.

12. The computer-readable medium of claim 1 wherein the second type of data that indicates the shape of the represented road segment comprises low frequency curvature data that represents overall shape of the represented road segment.

13. The computer-readable medium of claim 1 wherein the first type of data that indicates the location of a line that coincides generally with a physical centerline of the represented road segment comprises high frequency positional data that represents high frequency lane center variations.

14. A vehicle system for assisting a driver of a vehicle comprising:
   a database that represents road segments upon which the vehicle is traveling, wherein the data is stored on a computer-readable medium, further wherein the database comprises representations of road segments, wherein at least some of the road segments are represented by two separate types of data, wherein the two separate types of data include a first type of data that indicates a location of a line that coincides generally with a physical centerline of the represented road segment, wherein the data that indicates the location of the line includes a location of at least two nodes, and a second type of data that indicates a shape of the represented road segment, wherein the data that indicates the shape represents a substantially continuous curve that is independent of node location;
   a first application that uses the first type of data to determine a position of the vehicle; and
   a second application that uses the second type of data to provide a feature to the driver that relates to curvature of the road upon which the vehicle is traveling.

15. The system of claim 14 wherein the second application is a curve warning application.

16. The system of claim 14 wherein the second application is an adaptive transmission control system.

17. The system of claim 14 wherein the first application is lane departure warning system.

18. The system of claim 14 wherein the first application is lane departure control system.

19. The system of claim 14 wherein the first application provides navigation-related features.

20. The system of claim 19 wherein the navigation-related features include route calculation, route guidance, vehicle positioning, and map display.

21. The system of claim 14 wherein the first type of data that indicates a location of a line that coincides generally with a physical centerline of the represented road segment comprises high frequency positional data that represents high frequency lane center variations of the represented road segment.

22. The system of claim 21 wherein the first application is a lane departure warning system and wherein the lane warning system uses the high frequency positional data.

23. The system of claim 21 wherein the first application is a lane departure control system and wherein the lane control system uses the high frequency positional data.

24. The system of claim 14 wherein the second type of data that indicates the shape of the represented road segment comprises low frequency curvature data that represents overall shape of the represented road segment.

25. The system of claim 24 wherein the second application is a curve warning application and wherein the curve warning application uses the low frequency curvature data.

26. The system of claim 24 wherein the second application is an adaptive transmission control application and wherein the adaptive transmission control application uses the low frequency curvature data.

27. A computer-readable medium comprising a map database, the map database comprising:
 representations of lanes of road segments, wherein at least some of the lanes road segments are represented by two separate types of data, wherein the two separate types of data include
 a first type of data that indicates a location of a line that coincides generally with a physical centerline of the represented lane of a road segment, wherein the data that indicates the location of the line includes a location of at least two nodes, and
 a second type of data that indicates a shape of the represented lane of a road segment, wherein the data that indicates the shape represents a substantially continuous curve that is independent of node location.

28. A computer-readable medium comprising a map database, the map database comprising:
 representations of road segments, wherein at least some of the road segments are represented by two separate types of data, wherein the two separate types of data include:
 a first type of data that indicates a location of a line that coincides generally with a position of the represented road segment, wherein the data that indicates the location of the line includes a location of at least two nodes, and
 a second type of data that indicates a shape of the represented road segment, wherein the data that indicates the shape represents a substantially continuous curve that is independent of node location.

29. The computer-readable medium of claim 28 wherein the second type of data that indicates the shape of the represented road segment comprises a maneuver-dependent vehicle path.

30. The computer-readable medium of claim 29 wherein at least one of the representations of road segments comprises:
 a third type of data that indicates a second maneuver-dependent vehicle path.

31. The computer-readable medium of claim 28 wherein the second type of data that indicates the shape of the represented road segment comprises elevation data.

32. A vehicle system for assisting a driver of a vehicle, the system comprising:
 a database that represents road segments upon which the vehicle is traveling, wherein the data is stored on a computer-readable medium, further wherein the database comprises representations of road segments, wherein at least some of the road segments are represented by two separate types of data, wherein the two separate types of data include a first type of data that indicates a location of a line that coincides generally with a position of the represented road segment, wherein the data that indicates the location of the line includes a location of at least two nodes, and a second type of data that indicates a maneuver-dependent vehicle path on the represented road segment, wherein the data that indicates the shape represents a substantially continuous curve that is independent of node location; and
 an application that uses the second type of data to determine a position of the vehicle with respect to the maneuver-dependent vehicle path and that alerts the driver of the vehicle to departures from the vehicle-dependent vehicle path.

* * * * *